(12) United States Patent
Meagher et al.

(10) Patent No.: US 7,729,098 B2
(45) Date of Patent: Jun. 1, 2010

(54) OVERLOAD PROTECTION METHOD

(75) Inventors: Thomas Bruce Meagher, Houston, TX (US); Kenneth John Murphy, Henderson, NV (US); Linda M Murphy, legal representative, Henderson, NV (US)

(73) Assignee: ICS Triplex Technology Limited, Essex (GB)

( * ) Notice: Subject to any disclaimer, the term of this patent is extended or adjusted under 35 U.S.C. 154(b) by 553 days.

(21) Appl. No.: 11/689,703

(22) Filed: Mar. 22, 2007

(65) Prior Publication Data

US 2008/0019069 A1 Jan. 24, 2008

Related U.S. Application Data

(60) Provisional application No. 60/785,537, filed on Mar. 24, 2006.

(30) Foreign Application Priority Data

May 31, 2006 (EP) .................................. 06114806

(51) Int. Cl.
*H02H 9/02* (2006.01)
*H02H 1/00* (2006.01)

(52) U.S. Cl. ..................................................... 361/93.2

(58) Field of Classification Search ................. 361/93.2, 361/93.9

See application file for complete search history.

(56) References Cited

U.S. PATENT DOCUMENTS

| | | | |
|---|---|---|---|
| 4,535,378 A | 8/1985 | Endo et al. |
| 4,539,683 A | 9/1985 | Hahn et al. |
| 4,679,028 A | 7/1987 | Wilson |
| 5,128,625 A | 7/1992 | Yatsuzuka et al. |
| 5,293,082 A | 3/1994 | Bathaee |
| 5,324,989 A | 6/1994 | Thornton et al. |
| 5,552,881 A | 9/1996 | Jezwinski et al. |
| 5,594,439 A | 1/1997 | Swanson |
| 5,621,603 A | 4/1997 | Adamec et al. |
| 5,774,321 A | 6/1998 | Kim et al. |
| 5,867,014 A | 2/1999 | Wrathall et al. |
| 5,896,263 A | 4/1999 | Terdan et al. |
| 5,909,660 A | 6/1999 | Foote |
| 6,061,006 A | 5/2000 | Hopkins |
| 6,125,024 A | 9/2000 | LeComte et al. |

(Continued)

FOREIGN PATENT DOCUMENTS

DE 19750349 5/1998

(Continued)

OTHER PUBLICATIONS

European Search Report for European Application 06114802.9, Sep. 5, 2006, European Patent Office.

(Continued)

*Primary Examiner*—Ronald W Leja
(74) *Attorney, Agent, or Firm*—Boyle Fredrickson LLP; William R. Walburn; John M. Miller

(57) ABSTRACT

This invention relates to fault detection in electrical circuits. The invention provides a switch for a fault tolerant digital output module comprising: an output transistor pair for enabling and disabling an alternating output current; and a current limiter for clamping the output current to a predetermined maximum value.

9 Claims, 4 Drawing Sheets

U.S. PATENT DOCUMENTS

| | | | |
|---|---|---|---|
| 6,320,283 | B1 | 11/2001 | Salim et al. |
| 6,339,236 | B1 * | 1/2002 | Tomii et al. .................. 257/228 |
| 6,351,835 | B1 | 2/2002 | Sakaguchi |
| 6,400,163 | B1 | 6/2002 | Melcher et al. |
| 6,459,599 | B1 | 10/2002 | Agirman et al. |
| 6,557,131 | B1 | 4/2003 | Arabi |
| 6,594,129 | B1 | 7/2003 | Baba et al. |
| 6,653,963 | B1 | 11/2003 | Barrenscheen et al. |
| 6,657,464 | B1 | 12/2003 | Balardeta et al. |
| 6,768,350 | B1 | 7/2004 | Dickey |
| 2003/0043521 | A1 | 3/2003 | Thiele |
| 2003/0063679 | A1 | 4/2003 | Scrofano |
| 2004/0125007 | A1 | 7/2004 | Pezzini |
| 2005/0135037 | A1 | 6/2005 | Thiery et al. |
| 2005/0154945 | A1 | 7/2005 | Haag et al. |
| 2005/0174273 | A1 | 8/2005 | Luo et al. |
| 2005/0248477 | A1 | 11/2005 | Jongsma et al. |
| 2006/0061303 | A1 | 3/2006 | Takeda et al. |

FOREIGN PATENT DOCUMENTS

| | | |
|---|---|---|
| EP | 0325786 | 8/1989 |
| EP | 0789458 | 8/1997 |
| EP | 1322139 | 6/2003 |
| EP | 1545163 | 6/2005 |
| JP | 55096708 | 7/1980 |
| JP | 60236073 | 1/1985 |
| JP | 08023244 | 1/1996 |
| WO | WO03107019 | 12/2003 |

OTHER PUBLICATIONS

European Search Report for European Application 06114803.7, Sep. 1, 2006, European Patent Office.

European Search Report for European Application 06114806.0, Aug. 30, 2006, European Patent Office.

European Search Report for European Application 06114800.3, Sep. 1, 2006, European Patent Office.

European Search Report for European Application 06114804.5, Aug. 18, 2006, European Patent Office.

European Search Report for European Application 06114805.2, Aug. 24, 2006, European Patent Office.

European Search Report for European Application 06114801.1, Sep. 11, 2006, European Patent Office.

Sigma-Delta-ADC in Software, Design&Elektronik, Product Brochure, 1998, pp. 1-18, XP002398239.

* cited by examiner

OVERLOAD PROTECTION METHOD

This application is related to and claims priority from U.S. Provisional Application No. 60/785,537 filed Mar. 24, 2006 entitled Fault Detection and Apparatus, which is incorporated fully herein by reference.

BACKGROUND

Field of the Invention

This invention relates to fault detection in electrical circuits, in particular it relates to overload protection in a switch circuit for digital output modules.

In safety control systems, fault tolerance is of utmost importance. Fault tolerance is the ability to continue functioning in the event of one or more failures within the system.

Fault tolerance may be achieved by a number of different techniques, each with its specific advantages and disadvantages. One example of fault tolerance is known as Hardware Implemented Fault Tolerance (HIFT). HIFT means that the system relies on robust hardware circuits (as opposed to complex software algorithms) to perform the fault detection and redundancy management functions. A significant advantage HIFT has over software-implemented fault tolerance is that HIFT eliminates the overhead for communications between processors, leaving more time for controlling the process. This makes HIFT systems significantly faster and more dependable than systems using software-implemented fault tolerance.

An example of a HIFT system is a system which provides redundancy, in particular Triple Modular Redundancy (TMR). Using TMR, critical circuits are triplicated and perform identical functions simultaneously and independently. The data output from each of the three circuits is voted in a majority-voting circuit, before affecting the system's outputs. If one of the triplicated circuits fails, its data output is ignored. However, the system continues to output to the process the value (voltage, current level, or discrete output state) that agrees with the majority of the functional circuits. TMR provides continuous, predictable operation.

HIFT and TMR provides for automatic fault recovery with no disruption to system operation and ensures minimal fault detection periods.

Another approach to fault tolerance is the use of hot-standby modules. This approach provides a level of fault tolerance whereby the standby module maintains system operation in the event of module failure. With this approach there may be some disruption to system operation during the changeover period if the modules are not themselves fault-tolerant.

Fault tolerant systems ideally create a Fault Containment Region (FCR) to ensure that a fault within the FCR boundary does not propagate to the remainder of the system. This enables multiple faults to co-exist on different parts of a system without affecting operation.

Fault tolerant systems generally employ dedicated hardware and software test and diagnostic regimes that provide very fast fault recognition and response times to provide a safer system.

Commonly, it is possible to repair faults without interrupting system operation (known as hot replacement). For example active and standby module may operate in parallel so that if an active module becomes faulty there is an automatic change over to a standby module.

Safety control systems are generally designed to be 'fail-operational/fail-safe'. Fail operational means that when a failure occurs, the system continues to operate: it is in a fail-operational state. The system should continue to operate in this state until the failed module is replaced and the system is returned to a fully operational state.

An example of fail safe operation occurs, for example if, in a TMR system, a failed module is not replaced before a second failure in a parallel circuit occurs, the second failure should cause the TMR system to shut down to a fail-safe state.

Typical safety control applications include emergency and safety shutdown systems, process control, reactor control, wellhead control, turbine and compressor control, fire and gas detection and abatement, and are applicable to many industries including oil and gas production and refining, chemical production and processing, power generation, paper and textile mills and sewage treatment plants.

SUMMARY OF THE INVENTION

According to the invention there is provided a switch for a fault tolerant digital output module comprising: an output transistor pair for enabling and disabling an alternating output current; and a current limiter for clamping the output current to a predetermined maximum value.

Preferably, the current limiter comprises a pair of current sense transistors.

Preferably the switch further comprises a voltage monitor for monitoring the voltage across the output transistor and which sets a signal in the event that the monitored voltage exceeds a predetermined maximum voltage and which is arranged in operation to sample the overvoltage signal at overvoltage sampling intervals and in the event that that the output transistor is enabling the output alternating current and the overvoltage signal is set for more than a predetermined number of voltage samples an overload condition is detected.

In a preferred embodiment the voltage sampling interval is substantially equal to 60 µs, the predetermined maximum voltage value is substantially between 10V and 35V and the predetermined number of voltage samples is equal to 1, 2, 3 or 4.

Preferably, the switch further comprises a current monitor for monitoring the current through the output transistor and which is arranged in operation to sample the current at current sampling intervals and in the event that the current exceeds a predetermined absolute maximum current value for more than a predetermined number of current samples an overload condition is detected.

In a preferred embodiment, the current sampling interval is substantially equal to 240 µs and the predetermined number of current samples is in the range 1-4.

Preferably, the switch further comprises an average current monitor for monitoring the average current though the output transistors and which is arranged in operation to sample the average current at average current sampling intervals and in the event that the average current exceeds an average current predetermined threshold for more than a predetermined number of AC cycles an overload condition is detected.

In a preferred embodiment, the average current sampling interval is substantially equal to 300 ms and the predetermined number of AC cycles is 3.

BRIEF DESCRIPTION OF THE DRAWINGS

The invention will now be described, by way of example only, with reference to the accompanying drawings in which.

DETAILED DESCRIPTION

Figure 1:
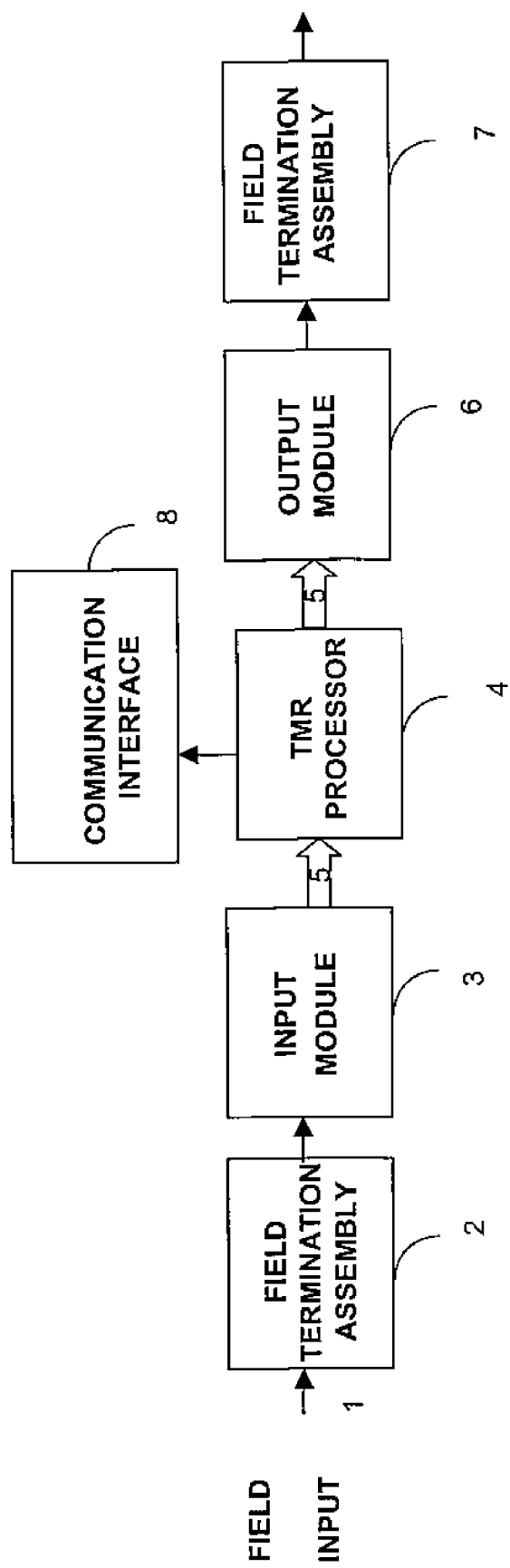
FIG. 1 illustrates schematically a fault tolerant architecture.

Referring now to FIG. 1, signals 1 from an input field device (not shown) are connected to the system via an input Field Termination Assembly (FTA) 2. An input 3 module receives, buffers and carries out any necessary conversion of the input data from the field device. The input data is then transmitted over a triplicated Inter-Module Bus (IMB) 5 to a TMR processor 4. Triplicated microprocessors of the TMR processor receive the input data from each channel of the IMB 5 and carry out a majority vote of the data. During data processing, each of the three processors compares and majority votes its input data against that of the other two processors. The processors synchronously execute the application program, and the derived output data is transmitted back to the IMB. An output module 6 receives, majority votes, and carries out any necessary conversion of the output data from the TMR processor 4. The output circuits are then driven by the majority-voted command. The output signals are connected to a field device (not shown) via an output FTA 7. A communications interface 8 provides facilities to allow systems to be networked using peer to peer communications links, the collection of Sequence of Events (SOE) data, and connection to other systems.

If an internal circuit in the system fails, it is simply voted out. Comprehensive distributed voting both out-votes failures, preventing them from being propagated into the process, and simplifies the process of identifying where faults have occurred.

Figure 2:
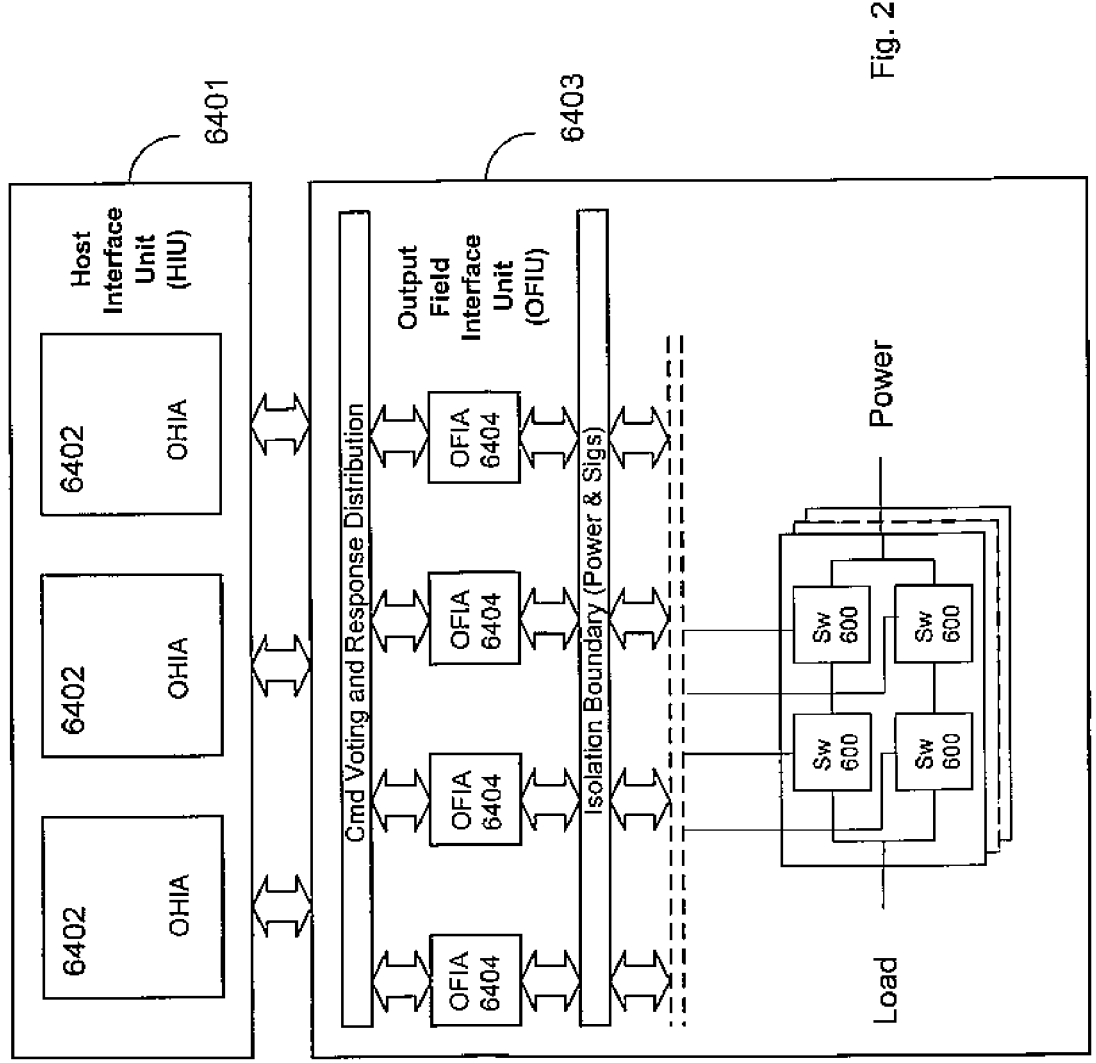
FIG. 2 is a block diagram of a fault tolerant output module.

FIG. 2 illustrates an output module 6 comprising a host interface unit 6401 which provides fault-tolerant communications, control, and processing facilities for the module. Output functions of the host interface unit 6401 are contained in replicated output host interface units 6402 and related DSP firmware. The output host interface units 6402 provide communication facilities to and from an output field interface unit 6403.

The output field interface unit 6403 comprises replicated output field interface modules 6404 which are galvanically isolated from replicated output switches 600 connected in a series/parallel configuration as shown.

For safety systems it is beneficial for output modules driving alternating current loads to protect the drive circuitry from damage due to external short circuit faults, as well as from less extreme load problems that may cause long-term overheating of the output drivers if not recognised. The method of protection must be balanced against the requirement to provide as much current to the load as is safely possible.

In the preferred embodiment of the invention, there are four layers of protection to prevent overload damage to the output module, while handling turn-on current surges and tolerating brief overloads.

Figure 3:
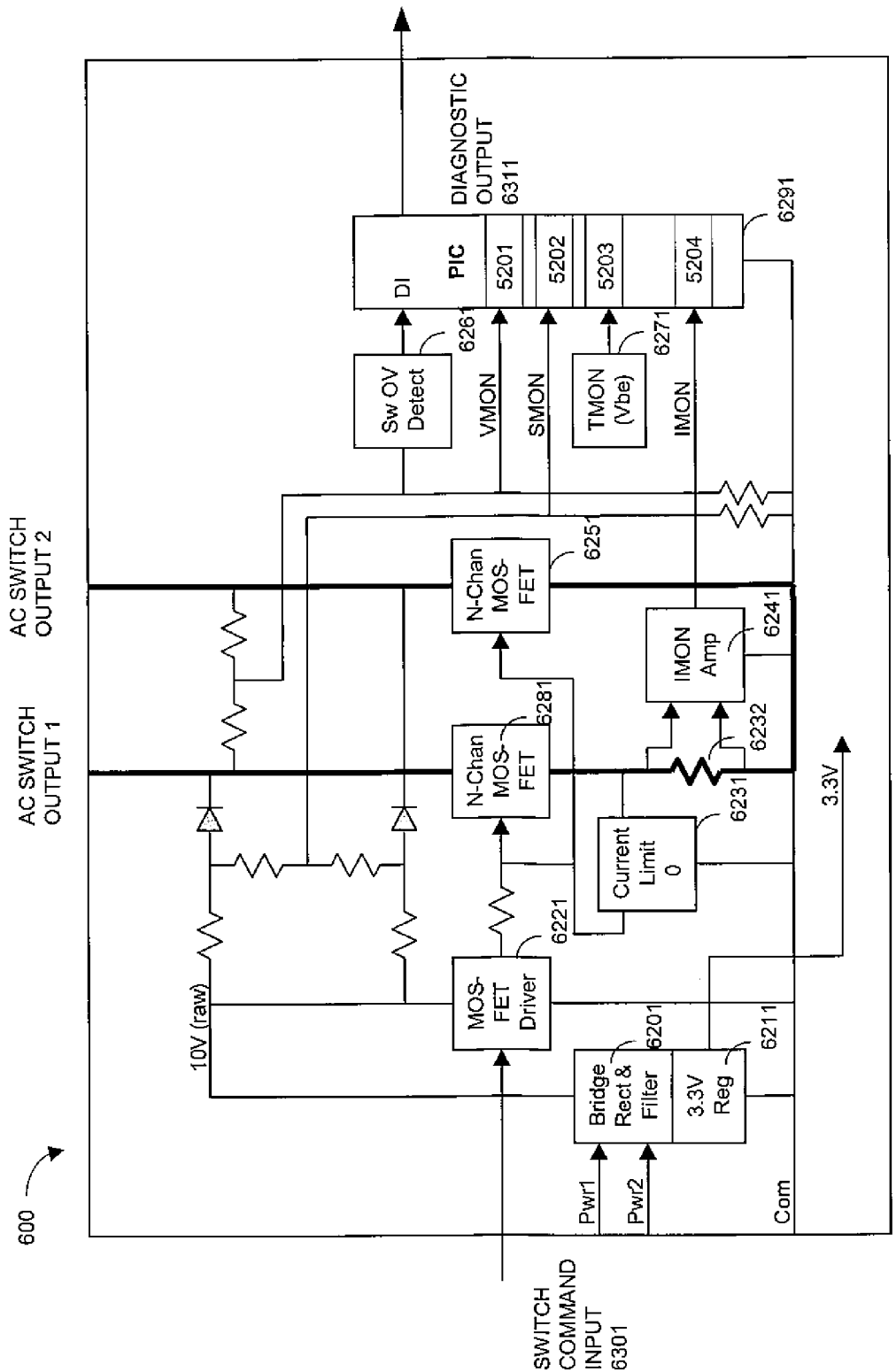
FIG. 3 is a block diagram illustrating a fault tolerant AC digital output module switch section.

FIG. 3 illustrates an output switch 600 according to a preferred embodiment of the invention. A binary input signal 6301 received from the output field interface module 6404 indicates whether the AC switch output is to be enabled or disabled.

A driver 6221 receives the input signal and drives two back-to-back FET output transistors 6281, 6251 in dependence upon the received signal 6301.

A transformer isolated high frequency AC input power signal differential pair (Pwr1 and Pwr2) are rectified and regulated by a bridge rectifier and filter 6201 and a voltage regulator 6211 to generate isolated 10V and 3.3V power supplies for various components.

A first level of overload protection is implemented in hardware directly in the output transistor control circuit. Each gate of the FET output transistors 6281, 6251 is clamped with a current sense NPN transistor pair 6231.

This current limiting transistor pair 6231 provides a virtually instantaneous current limit function to approximately 10 A to 40 A, depending upon the desired output current range of the implementation.

The voltage across the FET output transistors 6281, 6251 is measured by the signal VMON and the current through the FET output transistors 6281, 6251 is measured using the signal IMON which measures the current though a current sense resistor 6232.

A second level of overload protection is provided by monitoring the voltage across the output transistors at a relatively high sample rate, in the preferred embodiment every 60 µs, and sending a signal to a diagnostic monitor 6291. The monitoring is done in hardware by a switch overvoltage detect transistor 6261. When the voltage across R2121 (FIG. 3) ie VMON is great enough to turn on the transistor, then the result is that the signal that is sent to the output field interface module 6040 indicates excessive voltage across the switch.

In the preferred embodiment this signal is asserted if the voltage exceeds between 10V to 35V, depending upon the output current rating of the switch. If the output field interface module 6040 is commanding binary input signal 6301 such that the output is enabled, and if the voltage exceeds the predetermined maximum voltage value for more than a predetermined number of samples (in the range of 1-4 in the preferred embodiment), the output field interface module 6040 sets an overload condition and sends it via the binary input signal 6301 to be reset in order to turn the FET output transistors 6281, 6251 off and thus to disable the AC output.

A third layer of protection is provided by monitoring the load current every alternating current cycle. The load current is digitized every 240 µs and transmitted to the output host interface unit 6402 via the output field interface unit 6404 as signal IMON by the diagnostic monitor 6291. If the output host interface unit 6402 detects that the load current has saturated the IMON A/D converters in either or both directions for three consecutive AC cycles, then the output field interface module 6404 is instructed to set an overload condition and cause the binary input signal 6301 to be reset in order to turn the FET output transistors 6281, 6251 off and thus to disable the AC output.

A final layer of protection involves monitoring the load current for a persistent long term average magnitude that would result in too much heat being dissipated in the output FETs, resulting in their junction temperature exceeding the maximum rating. This is performed by in the output host interface unit 6402 by sampling the IMON load current signal every 300 mSec and averaging the value in the output host interface unit 6402. If it exceeds a given predetermined maximum average value for more than 1.5 seconds, the switch is turned off as before.

There is also a temperature monitor 6271 which sends a temperature monitor signal to the output field interface module 6404 via the diagnostic monitor 6291

Figure 4:
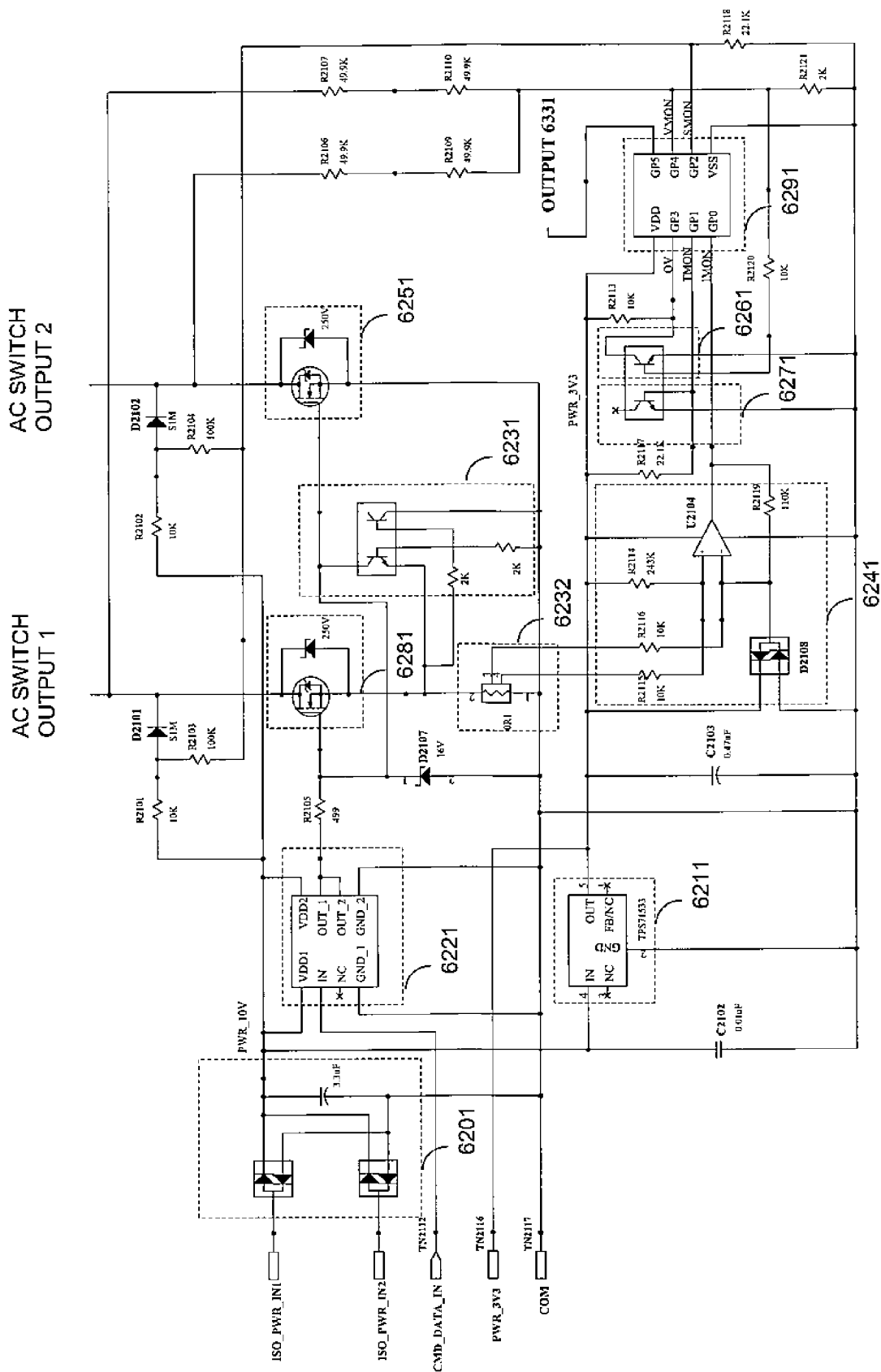
FIG. 4 is a circuit diagram of a fault tolerant AC digital output module switch section.

FIG. 4 illustrates the internal components of the block shown in FIG. 3 in more detail.

It is to be recognised that various alterations, modifications, and/or additions may be introduced into the constructions and arrangements of parts described above without departing from the scope of the present invention as defined in the following claims.

The invention claimed is:

1. A switch for a fault tolerant digital output module comprising:
   an output transistor pair for enabling and disabling an alternating output current;
   a current limiter circuit clamping the output current to a predetermined maximum value and maintaining current flow through the output transistor pair;
   a voltage monitor for monitoring the voltage across the output transistor pair and which sets an overvoltage signal in the event that the monitored voltage exceeds a predetermined maximum voltage and which is arranged in operation to sample the overvoltage signal at overvoltage sampling intervals and in the event that the output transistor is enabling the output alternating current and the overvoltage signal is set for more than a predetermined number of voltage samples an overload condition is detected.

2. A switch according to claim 1, in which:
   the current limiter circuit comprises a current sense resistor connected in series with the output transistor pair and a pair of current limiting transistors; and
   the voltage sampling interval is substantially equal to 60 μs, the predetermined maximum voltage value is substantially between 10V and 35V and the predetermined number of voltage samples is equal to 1, 2, 3 or 4.

3. A switch according to claim 1, further comprising a current monitor for monitoring the current through the output transistor pair and which is arranged in operation to sample the current at current sampling intervals and in the event that the current exceeds a predetermined absolute maximum current value for more than a predetermined number of current samples an overload condition is detected.

4. A switch according to claim 3, in which the current sampling interval is substantially equal to 240 μs and the predetermined number of current samples is in the range 1-4.

5. A switch according to claim 3, further comprising an average current monitor for monitoring the average current through the output transistor pair and which is arranged in operation to sample the average current at average current sampling intervals and in the event that the average current exceeds an average current predetermined threshold for more than a predetermined number of AC cycles an overload condition is detected.

6. A switch according to claim 5, in which the average current sampling interval is substantially equal to 300 ms and the predetermined number of AC cycles is 3.

7. A switch according to claim 5 wherein a first length of time calculated by the overvoltage sampling interval multiplied by the predetermined number of voltage samples to detect an overload condition is less than a second length of time calculated by the current sampling interval multiplied by the predetermined number of current samples to detect an overload condition.

8. A switch according to claim 7 wherein a third length of time calculated by the period of one AC cycle multiplied by the predetermined number of AC cycles is greater than the second length of time.

9. A switch for a fault tolerant digital output module comprising:
   an output transistor pair for enabling and disabling an output current;
   a current limiter circuit clamping the output current to a predetermined maximum value and maintaining current flow through the output transistor pair;
   a voltage monitor circuit for monitoring the voltage across the output transistor pair wherein an overvoltage signal is set if the monitored voltage exceeds a predetermined maximum voltage;
   a current monitor circuit for monitoring the current through the output transistor pair; and
   a processor sampling the overvoltage signal at overvoltage sampling intervals and sampling the current at current sampling intervals, wherein:
   the processor sets an overload condition signal if the overvoltage signal is set for more than a predetermined number of overvoltage sampling intervals,
   the processor sets the overload condition signal if the current exceeds a predetermined maximum current value for more than a predetermined number of current sampling intervals,
   the processor determines an average current value, and
   the processor sets the overload condition signal if the average current value exceeds a predetermined average current threshold for more than a predetermined length of time.

* * * * *